(12) United States Patent
Murrow, Jr.

(10) Patent No.: US 10,888,990 B2
(45) Date of Patent: Jan. 12, 2021

(54) HOT STICK DEVICE WITH PUSH BUTTON CONNECTOR AND RELATED METHODS

(71) Applicant: David Larry Murrow, Jr., San Mateo, FL (US)

(72) Inventor: David Larry Murrow, Jr., San Mateo, FL (US)

(\*) Notice: Subject to any disclaimer, the term of this patent is extended or adjusted under 35 U.S.C. 154(b) by 0 days.

(21) Appl. No.: 16/601,735

(22) Filed: Oct. 15, 2019

(65) Prior Publication Data

US 2020/0254603 A1 Aug. 13, 2020

Related U.S. Application Data

(60) Provisional application No. 62/803,681, filed on Feb. 11, 2019.

(51) Int. Cl.
| | |
|---|---|
| *B25G 3/38* | (2006.01) |
| *H02G 1/02* | (2006.01) |
| *B25G 3/26* | (2006.01) |
| *B25G 1/12* | (2006.01) |

(52) U.S. Cl.
CPC .............. *B25G 3/38* (2013.01); *B25G 1/12* (2013.01); *B25G 3/26* (2013.01); *H02G 1/02* (2013.01)

(58) Field of Classification Search
CPC ... B25G 1/06; B25G 1/12; B25G 3/38; B25G 3/24; B25G 3/26; H02G 1/02; H01H 85/0208; H01H 31/006
See application file for complete search history.

(56) References Cited

U.S. PATENT DOCUMENTS

| | | | |
|---|---|---|---|
| 2,291,593 A | 7/1942 | Hubbard | |
| 2,438,504 A | 3/1948 | Hubbard | |
| 3,205,522 A * | 9/1965 | Then | A47J 45/02 15/146 |
| 4,848,818 A * | 7/1989 | Smith | E04D 13/0765 294/181 |
| 4,917,343 A * | 4/1990 | Wainscott | A47B 23/06 248/284.1 |
| 5,547,305 A * | 8/1996 | Treche | B25B 5/006 403/103 |
| 5,564,852 A | 10/1996 | Maxwell et al. | |

(Continued)

OTHER PUBLICATIONS

Salisbury by Honeywell "Hot Sticks and Tools" www.salisburybyhoneywell.com; Retrieved from internet Aug. 23, 2018; pgs. 31.

*Primary Examiner* — David B. Thomas
(74) *Attorney, Agent, or Firm* — Allen, Dyer, Doppelt + Gilchrist, PA

(57) ABSTRACT

A hot stick device may include a tool connector having a connector body with a proximal end coupled to a distal end of an insulated shaft, a distal end, and first and second opposing longitudinal sides extending between the proximal end and the distal end. The first longitudinal side of the connector body may include a first interlocking interface. The tool connector may have a fastener having a head, and a threaded shaft extending in a through passageway, a first threaded nut threadingly engaging the threaded shaft, and a spring device coupled between the head and the second longitudinal side. The hot stick device may include an accessory tool with a second interlocking interface to engage with the first interlocking interface and coupled between the first threaded nut and the connector body.

20 Claims, 11 Drawing Sheets

(56) References Cited

U.S. PATENT DOCUMENTS

| | | | |
|---|---|---|---|
| 5,593,196 A | 1/1997 | Baum et al. | |
| 7,181,995 B2* | 2/2007 | Rider | B25D 1/00 |
| | | | 294/174 |
| 8,469,423 B1 | 6/2013 | Crowley, Jr. et al. | |
| 9,395,032 B2* | 7/2016 | Kotula | B25J 15/0061 |
| 9,429,187 B2* | 8/2016 | Kotula | B23Q 1/26 |
| 9,701,009 B2* | 7/2017 | Bukovitz | F16B 2/065 |
| 9,808,929 B2* | 11/2017 | Bukovitz | B25G 3/22 |
| 2007/0014108 A1* | 1/2007 | Uke | B25F 1/00 |
| | | | 362/191 |
| 2013/0236237 A1 | 9/2013 | Schmidt | |

\* cited by examiner

HOT STICK DEVICE WITH PUSH BUTTON CONNECTOR AND RELATED METHODS

RELATED APPLICATION

This application is based upon prior filed Application No. 62/803,681 filed Feb. 11, 2019, the entire subject matter of which is incorporated herein by reference in its entirety.

TECHNICAL FIELD

The present disclosure relates to the field of tool devices, and, more particularly, to an electrical hot stick device and related methods.

BACKGROUND

The power grid in the United States is expansive, and includes an intricate web of connections. The high number of connections requires regular maintenance. When power company personnel need to manipulate energized power lines, it is a requirement that a tool be used for safety reasons. Once such tool is a hot stick device. Hot stick devices are typically constructed of a suitable dielectric material and include a tool holder at a distal end. The tool holder is adaptable to engage a wide array of different tools.

The hot stick device allows a user to perform a wide variety of tasks such as opening and closing various types of switches, replacing fuses, pruning tree limbs or replacing lamps in street circuits and rooms with high ceilings. Since the workpiece may be as far as 30 feet or more away from a user, telescoping hot stick devices or poles provide a variable length to accommodate these tasks.

In some approaches, for example, as disclosed in U.S. Pat. No. 8,469,423 to Crowley, Jr. et al., the hot stick device includes a tool holder permitting rotational adjustment of the tool attached to the tool holder. In this approach, the tool engages radial teeth of the tool holder, and is manually clamped via a threaded stud and nut arrangement. One issue with these rotatable tool hot stick devices is that the user must manually rotate the tool by removing the threaded but and adjusting the tool. Since the user is usually elevated within a bucket truck, the user may struggle to adjust the tool, and may even drop the threaded nut while making the adjustment.

SUMMARY

Generally, a hot stick device may include an insulated shaft having a proximal end, and a distal end opposing the proximal end. The hot stick device may also include a tool connector including a connector body. The connector body may comprise a proximal end coupled to the distal end of the insulated shaft, a distal end, and first and second opposing longitudinal sides extending between the proximal end and the distal end of the connector body. The first longitudinal side of the connector body may include a first interlocking interface. The distal end may define a through passageway extending between the first and second opposing longitudinal sides. The tool connector also may include a fastener having a head, and a threaded shaft extending in the through passageway, a first threaded nut threadingly engaging the threaded shaft, and a spring device coupled between the head and the second longitudinal side. The hot stick device may comprise an accessory tool including a second interlocking interface to engage with the first interlocking interface and coupled between the first threaded nut and the connector body. The head of the fastener may be configured to longitudinally compress the spring device against the second longitudinal side, and longitudinally extend the threaded shaft and the first threaded nut thereon, thereby lifting the accessory tool and disengaging the first and second interlocking interfaces.

More specifically, the first interlocking interface may include a first inner radial shelf, and the distal end of the connector body may include a second inner radial shelf. The tool connector may include a second threaded nut positioned between the first inner radial shelf and adjacent portions of the second interlocking interface. For example, the first threaded nut may include a threaded wing nut. Each of the first interlocking interface and the second interlocking interface may include alternating recesses and protrusions.

In some embodiments, the proximal end of the connector body may include a hexagon-shaped outer radial edge. The proximal end of the connector body may define a circle-shaped recess within the hexagon-shaped outer radial edge and configured to receive the distal end of the insulated shaft.

Additionally, the tool connector may include a washer coupled between the head and the spring device. For example, the spring device may include a coil spring.

Another aspect is directed to a tool connector for a hot stick device having an insulated shaft having a proximal end, and a distal end opposing the proximal end. The tool connector may comprise a connector body including a proximal end coupled to the distal end of the insulated shaft, a distal end, and first and second opposing longitudinal sides extending between the proximal end and the distal end of the connector body. The first longitudinal side of the connector body may include a first interlocking interface. The distal end may define a through passageway extending between the first and second opposing longitudinal sides. The tool connector may also include a fastener having a head, and a threaded shaft extending in the through passageway, a first threaded nut threadingly engaging the threaded shaft, and a spring device coupled between the head and the second longitudinal side. Also, an accessory tool may have a second interlocking interface to engage with the first interlocking interface and is coupled between the first threaded nut and the connector body. The head of the fastener may be configured to longitudinally compress the spring device against the second longitudinal side, and longitudinally extend the threaded shaft and the first threaded nut thereon, thereby lifting the accessory tool and disengaging the first and second interlocking interfaces.

Yet another aspect is directed to a method for making a hot stick device. The method may include forming a tool connector including a connector body including a proximal end coupled to a distal end of an insulated shaft, a distal end, and first and second opposing longitudinal sides extending between the proximal end and the distal end of the connector body. The first longitudinal side of the connector body may include a first interlocking interface. The distal end may define a through passageway extending between the first and second opposing longitudinal sides. The tool connector may also include a fastener having a head, and a threaded shaft extending in the through passageway, a first threaded nut threadingly engaging the threaded shaft, and a spring device coupled between the head and the second longitudinal side. The method may include providing an accessory tool including a second interlocking interface to engage with the first interlocking interface and coupled between the first threaded nut and the connector body. The head of the fastener may be configured to longitudinally compress the spring device against the second longitudinal side, and longitudinally extend the threaded shaft and the first threaded nut thereon, thereby lifting the accessory tool and disengaging the first and second interlocking interfaces.

DETAILED DESCRIPTION

The present disclosure will now be described more fully hereinafter with reference to the accompanying drawings, in which several embodiments of the invention are shown. This present disclosure may, however, be embodied in many different forms and should not be construed as limited to the embodiments set forth herein. Rather, these embodiments are provided so that this disclosure will be thorough and complete, and will fully convey the scope of the present disclosure to those skilled in the art. Like numbers refer to like elements throughout.

Figure 1:
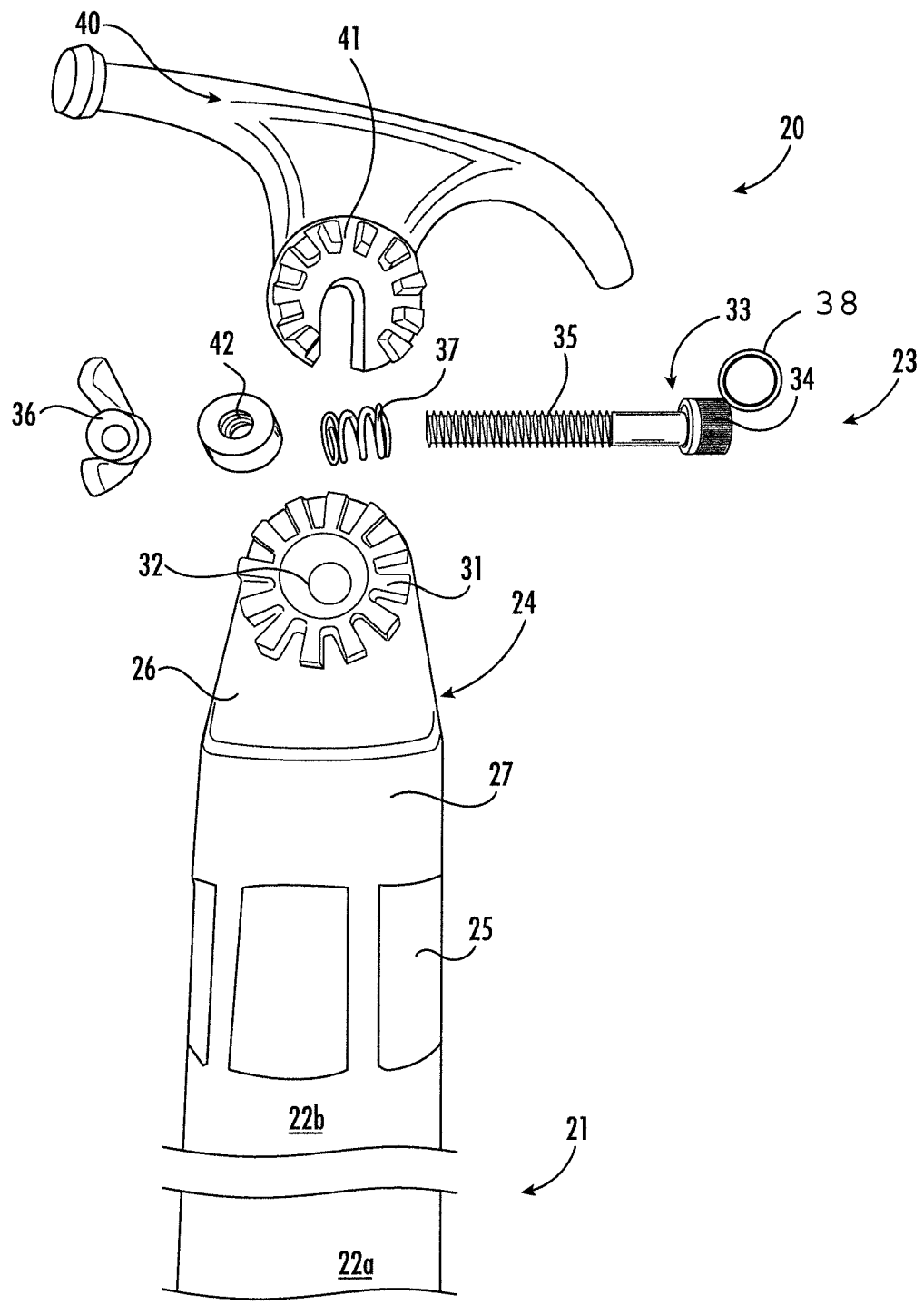
FIG. 1 is an exploded schematic view of a hot stick device, according to the present disclosure.
Figure 2:
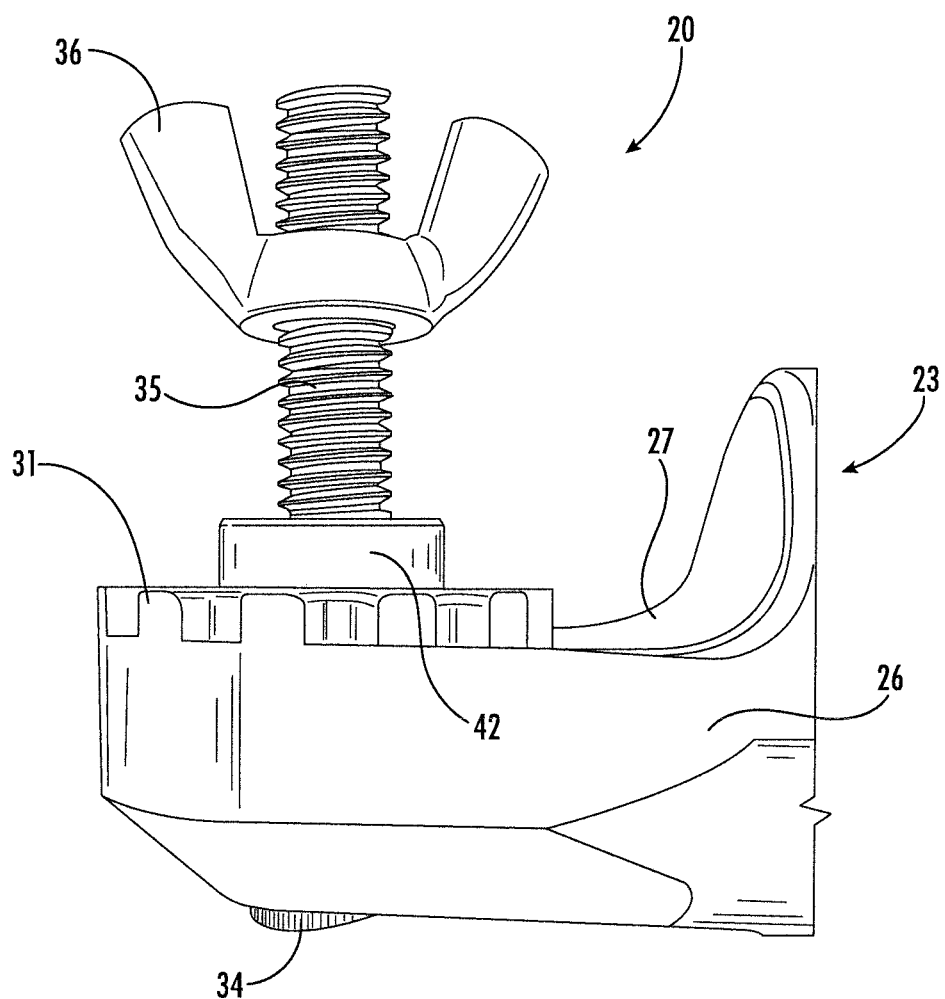
FIG. 2 is a partial left side elevational schematic view of the hot stick device from FIG. 1.
Figure 3:
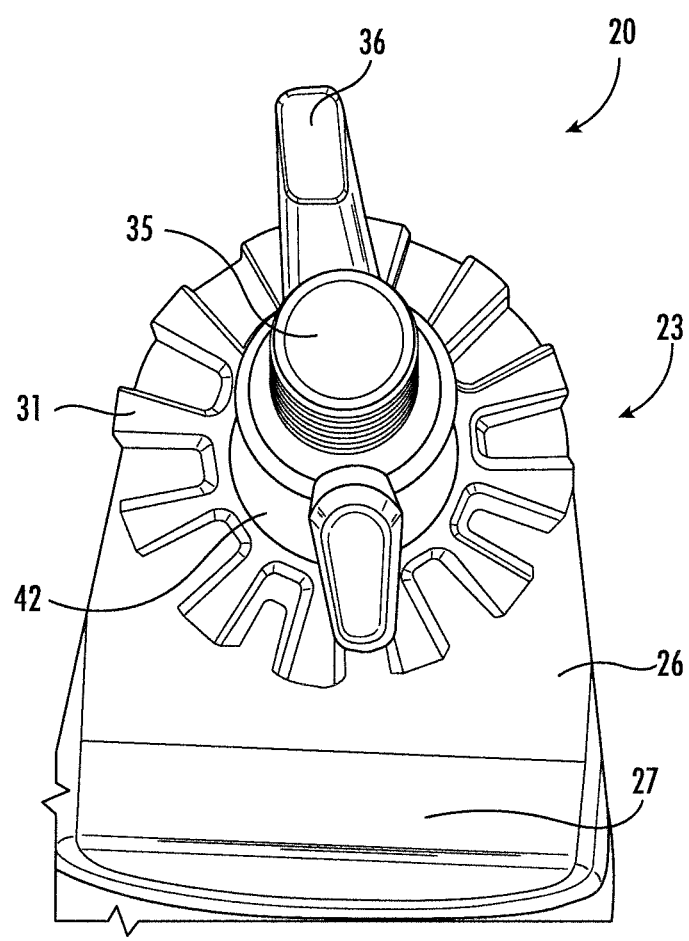
FIG. 3 is a partial front side plan elevational schematic view of the hot stick device from FIG. 1.
Figure 4:
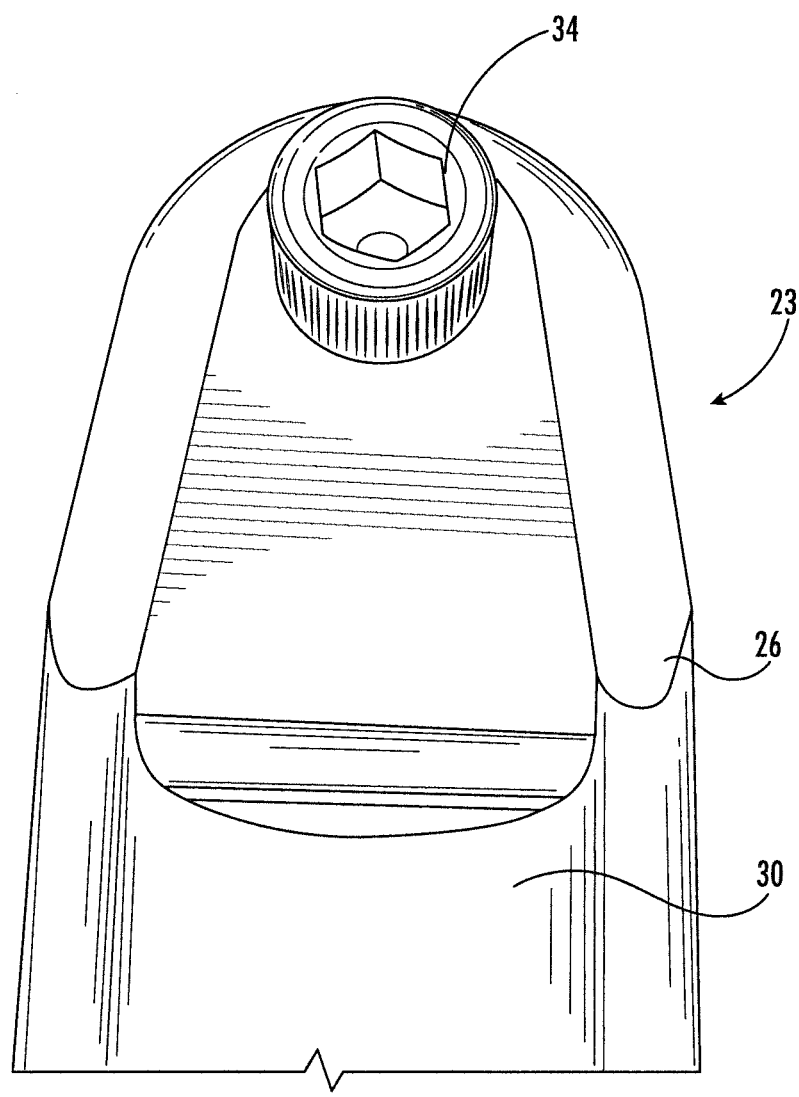
FIG. 4 is a partial back side plan elevational schematic view of the tool connector of the hot stick device from FIG. 1.
Figure 5:
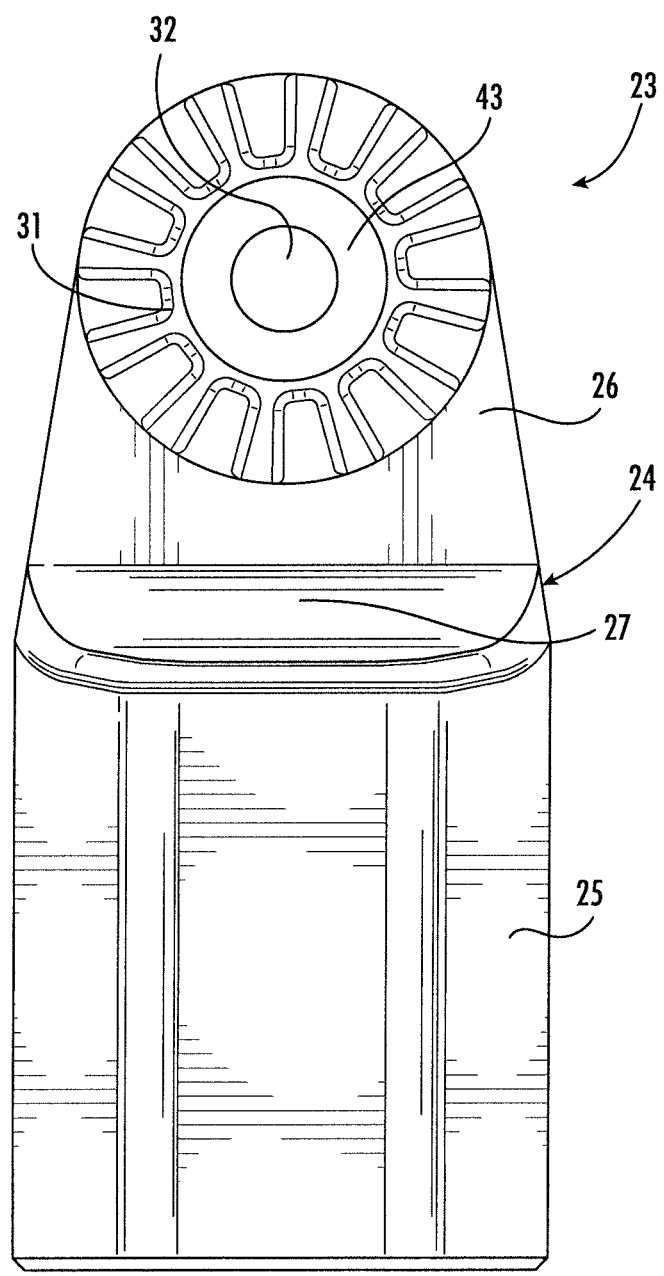
FIG. 5 is a front side plan schematic view of the tool connector of the hot stick device from FIG. 1.
Figure 6:
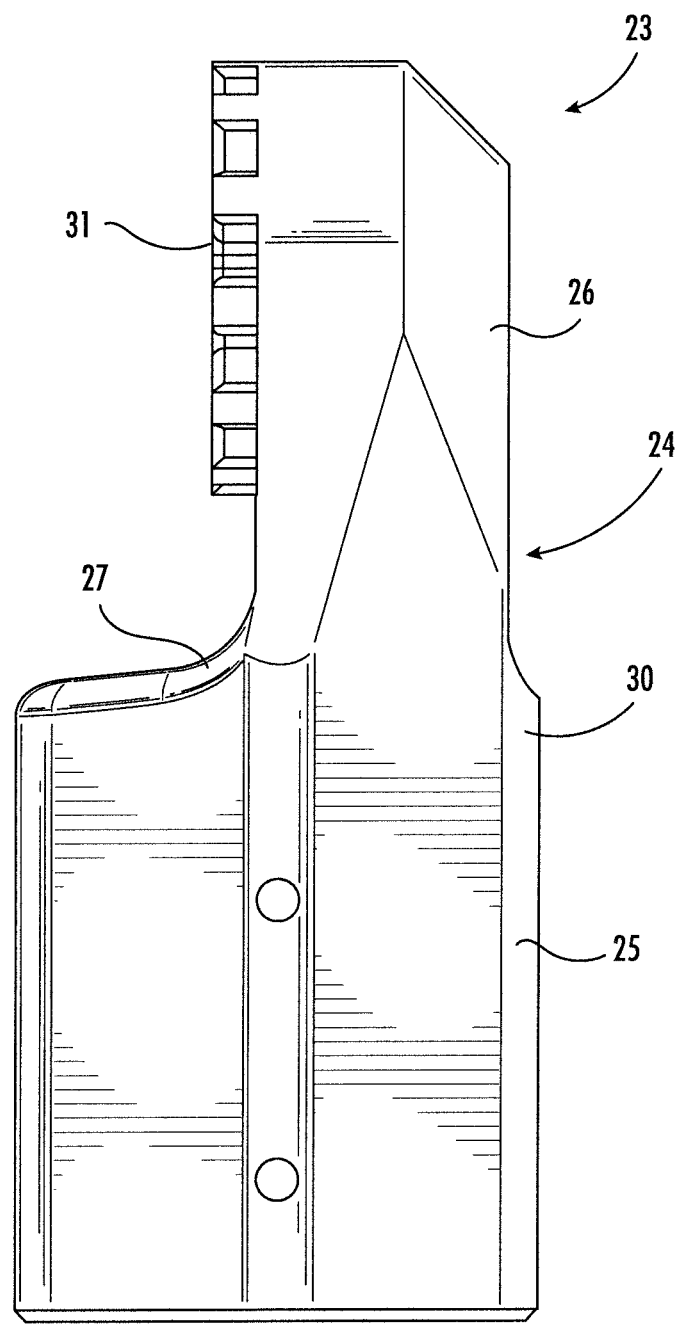
FIG. 6 is a right side elevational schematic view of the tool connector of the hot stick device from FIG. 1.
Figure 7:
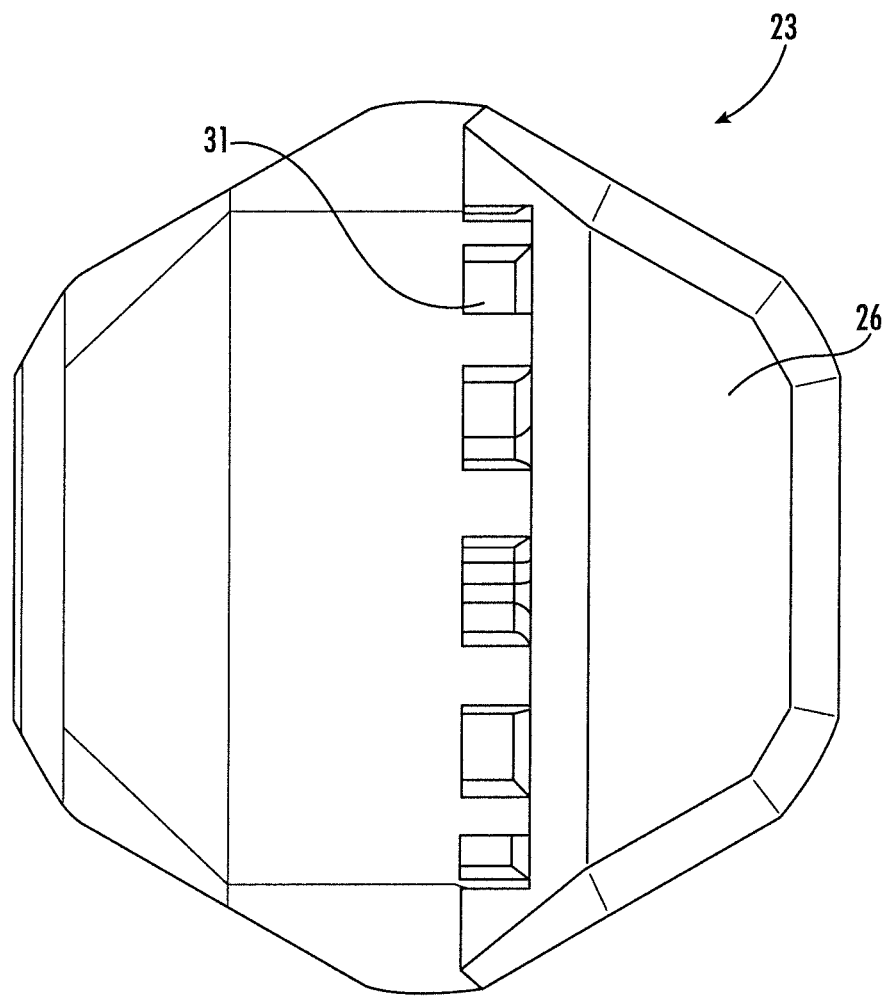
FIG. 7 is a top plan schematic view of the tool connector of the hot stick device from FIG. 1.
Figure 8:
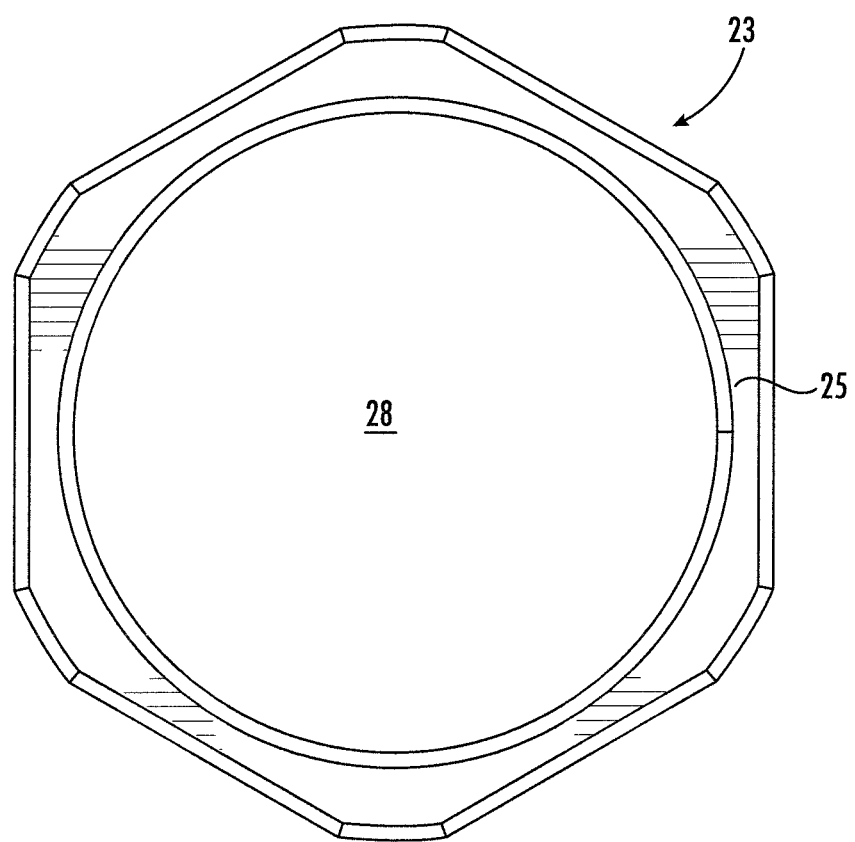
FIG. 8 is a bottom plan schematic view of the tool connector of the hot stick device from FIG. 1.
Figure 9:
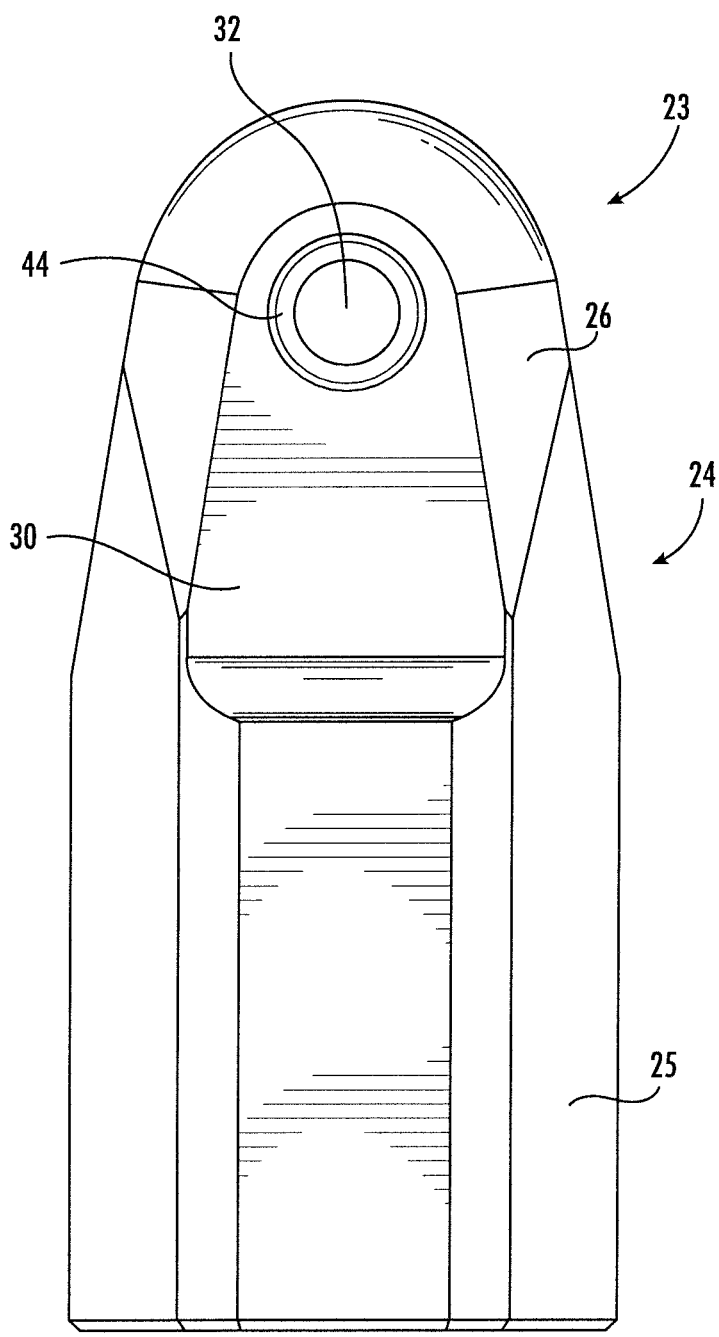
FIG. 9 is a back side plan schematic view of the tool connector of the hot stick device from FIG. 1.
Figure 10:
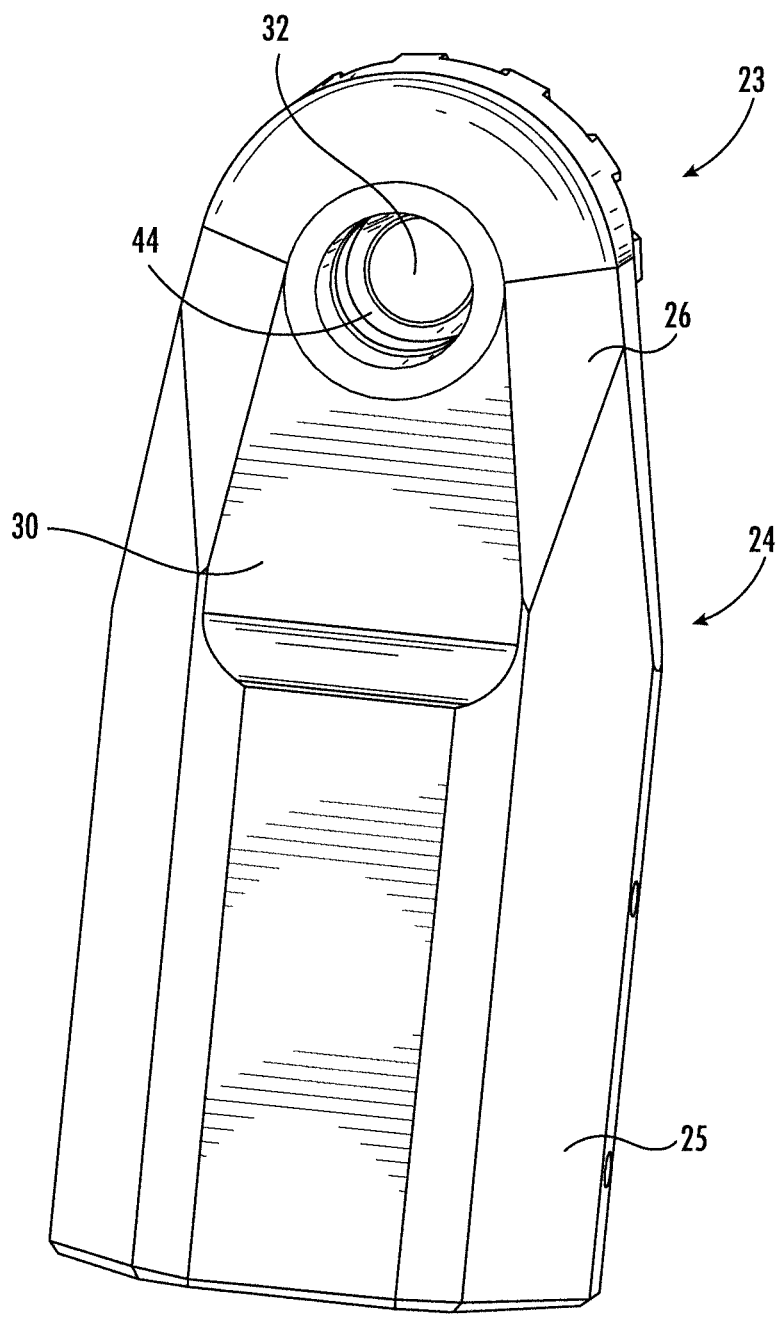
FIG. 10 is a perspective schematic view of the tool connector of the hot stick device from FIG. 1.
Figure 11:
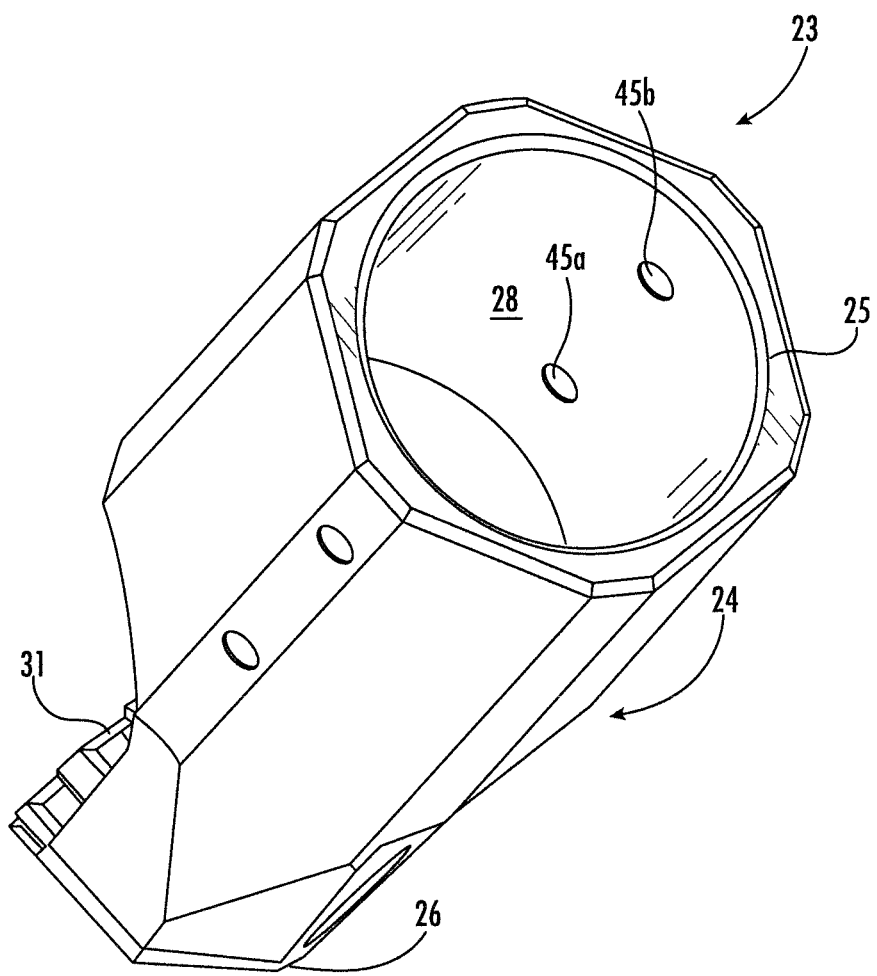
FIG. 11 is another perspective schematic view of the tool connector of the hot stick device from FIG. 1.

Referring to FIGS. 1-11, a hot stick device 20 according to the present disclosure is now described. The hot stick device 20 illustratively comprises an insulated shaft 21 (FIG. 1) having a proximal end 22a (FIG. 1), and a distal end 22b (FIG. 1) opposing the proximal end. As will be appreciated, the user would hold and manipulate the proximal end 22a of the insulated shaft 21. The insulated shaft 21 may comprise insulating material, such as a polymer plastic.

The hot stick device 20 illustratively comprises a tool connector 23 having a connector body 24 comprising a proximal end 25 coupled to the distal end 22b of the insulated shaft 21, a distal end 26, and first and second opposing longitudinal sides 27, 30 extending between the proximal end and the distal end of the connector body. As perhaps best seen in FIG. 8, the proximal end 25 of the connector body 24 illustratively includes a circle-shaped recess 28 configured to receive the distal end 22b of the insulated shaft 21. Of course, this shape is merely exemplary and could comprise a rectangle shape, triangle shape, a polygon shape (e.g. hexagon, octagon) for instance.

The first longitudinal side 27 of the connector body 24 illustratively comprises a first interlocking interface 31. As perhaps best seen in FIG. 5, the first interlocking interface 31 illustratively comprises an outer radial pattern of alternating recesses and protrusions. Each of the recesses comprises a U-shaped recess opening radially outward, and having opposing sides canted from a normal position from a tangent of the outer radial edge. In particular, the opposing sides are canted between 5°-15° from a normal position from the tangent of the outer radial edge.

The distal end 26 defines a through passageway 32 extending between the first and second opposing longitudinal sides 27, 30. The tool connector 23 illustratively includes a fastener 33 having a head 34, and a threaded shaft 35 extending in the through passageway 32, a first threaded nut 36 threadingly engaging the threaded shaft, and a spring device 37 coupled between the head and the second longitudinal side 30. The tool connector 23 illustratively includes a washer 38 coupled between the head 34 and the spring device 37 for permitted the spring device to securely sit against the head. In other words, the threaded shaft 35 is inserted sequentially through the washer 38, the spring device 37 and then in the through passageway 32. The spring device 37 illustratively comprises a coil spring, for example.

On the first longitudinal side 27, the first interlocking interface 31 illustratively includes a first inner radial shelf 43 circumscribing the through passageway 32. On the second longitudinal side 30, the distal end 26 of the connector body 24 illustratively includes a second inner radial shelf 44 circumscribing the through passageway 32.

The hot stick device comprises an accessory tool 40 (FIG. 1) comprising a second interlocking interface 41 to engage with the first interlocking interface 31 and coupled between the first threaded nut 36 and the connector body 24. As perhaps best seen in FIG. 1, the second interlocking interface 41 illustratively comprises an outer radial pattern of alternating recesses and protrusions configured to engage the first interlocking interface 31. In the illustrated example, the accessory tool 40 illustratively comprises a disconnect tool, but the accessory tool may comprise any hot stick accessory, such as a lighted disconnect tool, a pointed disconnect tool, a spiral disconnect tool, a S-hook tool, a blade tool, a fixed prong tool, a tie stick tool, a conductor brush tool, or a conductor cleaner tool, for example.

The tool connector 23 may comprise a rigid material sufficient to mechanically support the accessory tool 40. The rigid material comprise a metallic material, and/or a ceramic material, for example. As perhaps best seen in FIG. 11, the proximal end 25 of the tool connector 23 illustratively comprises a plurality of circle-shaped recesses 45a-45b for aiding receiving of the insulated shaft 21. As perhaps best seen in FIG. 1, the tool connector 23 illustratively comprises a second threaded nut 42 positioned between the first inner radial shelf 43 and adjacent portions of the second interlocking interface 41. For example, the second threaded nut 42 may comprise a standard flat-sided threaded nut, a self-clinching threaded nut, a flanged nut, and an unthreaded nut. As perhaps best seen in FIG. 8, the proximal end 25 of the tool connector 23 illustratively has a hexagon shape (i.e. so as to be rotated readily by a typical hand wrench tool), but may be circle-shaped or rectangle-shaped in some embodiments.

In use, to assemble the hot stick device 20, the user would sequentially insert the threaded fastener 33 through the washer 38, the spring device 37, and then in the through passageway 32. The spring device would rest upon the second inner radial shelf 44. The second threaded nut 42 would be threadingly engaged on the threaded shaft 35 until abutting the first inner radial shelf 43, but not compressing the spring device 37 on the other side of the through passageway 32.

At this point, the accessory tool 40 of choice would be fitted over the distal end of the threaded shaft 35 so that the first and second interlocking interfaces 31, 41 engage in the desired rotational position. The threaded shaft 35 would extend through the accessory tool 40 and be exposed on the opposite end. The first threaded nut 36 would be threadingly engaged over the exposed end of the threaded shaft 35 until a satisfactory fit has been provided.

In prior art devices, if the user desired another rotational position for the accessory tool 40, the first threaded nut 36 would be removed, and the accessory tool would be repositioned, and then, the first threaded nut would be tightened again. In many applications, the user may be elevated on a ladder or bucket truck, and this process is unwieldy and dangerous. Indeed, it is not uncommon for power line maintenance personnel to lose the first threaded nut 36 during these operations.

Advantageously, the hot stick device 20 may provide an approach to this issue. Rather than unfastening the first threaded nut 36, the user may readily push down on the head 34 of the threaded fastener 33, which will compress the spring device 37 longitudinally extending the second threaded nut 42, thereby lifting the accessory tool 40 and also disengaging the first and second interlocking interfaces 31, 41. This free rotation mode is perhaps best seen in FIG. 2 where the second threaded nut 42 is exposed and visible. The user may then readily reposition the rotational position of the accessory tool 40 and release the head 34, thereby reengaging the first and second interlocking interfaces 31, 41.

A method for making a hot stick device 20 comprises forming a tool connector 23. The tool connector 23 includes a connector body 24 comprising a proximal end 25 coupled to a distal end 22b of an insulated shaft 21, a distal end 26, and first and second opposing longitudinal sides 27, 30 extending between the proximal end and the distal end of the connector body. The first longitudinal side 27 of the connector body 24 includes a first interlocking interface 31, and the distal end 26 defines a through passageway 32 extending between the first and second opposing longitudinal sides 27, 30. The tool connector 23 comprises a fastener 33 having a head 34, and a threaded shaft 35 extending in the through passageway 32, a first threaded nut 36 threadingly engaging the threaded shaft, and a spring device 37 coupled between the head and the second longitudinal side 30. The method comprises coupling an accessory tool 40 between the first threaded nut 36 and the connector body 24, the accessory tool comprising a second interlocking interface 41 to engage with the first interlocking interface 31.

Yet another aspect is directed to a method for using/operating a hot stick device 20. The method includes providing a tool connector 23 including a connector body 24 including a proximal end 25 coupled to a distal end 22b of an insulated shaft 21, a distal end 26, and first and second opposing longitudinal sides 27, 30 extending between the proximal end and the distal end of the connector body. The first longitudinal side 27 of the connector body 24 includes a first interlocking interface 31. The distal end 26 defines a through passageway 32 extending between the first and second opposing longitudinal sides 27, 30. The tool connector 23 also includes a fastener 33 having a head 34, and a threaded shaft 35 extending in the through passageway 32, a first threaded nut 36 threadingly engaging the threaded shaft, and a spring device 37 coupled between the head and the second longitudinal side 30. The method includes coupling an accessory tool 40, the accessory tool including a second interlocking interface 41 to engage with the first interlocking interface 31. The accessory tool 40 is coupled between the first threaded nut 36 and the connector body 24. The method includes actuating or pushing the head 34 of the fastener 33 to longitudinally compress the spring device 37 against the second longitudinal side 30, and longitudinally extend the threaded shaft 35 and the first threaded nut 36 thereon, thereby lifting the accessory tool 40 and disengaging the first and second interlocking interfaces 31, 41. The method also includes rotating the accessory tool 40 to a desired position, and releasing the head 34 of the fastener 33.

It should be appreciated that the disclosed push release of the connector body 24 can be applied in other tools where rotational adjustment is needed. In other words, the depicted hot stick device 20 is merely exemplary, and the teachings herein may applied to other tools, such as a concrete float tool, an arborist device (e.g. pruning device), painting devices (e.g. paint roller extension pole with rotating head) or a broom bracket.

Many modifications and other embodiments of the present disclosure will come to the mind of one skilled in the art having the benefit of the teachings presented in the foregoing descriptions and the associated drawings. Therefore, it is understood that the present disclosure is not to be limited to the specific embodiments disclosed, and that modifications and embodiments are intended to be included within the scope of the appended claims.

That which is claimed is:

1. A hot stick device comprising:
    an insulated shaft having a proximal end, and a distal end opposing said proximal end;
    a tool connector comprising
        a connector body comprising
            a proximal end coupled to said distal end of said insulated shaft,
            a distal end, and
            first and second opposing longitudinal sides extending between said proximal end and said distal end of said connector body,
            said first longitudinal side of said connector body comprising a first interlocking interface,
            said distal end defining a through passageway extending between said first and second opposing longitudinal sides,
        a fastener having a head, and a threaded shaft extending in said through passageway,
        a first threaded nut threadingly engaging said threaded shaft, and
        a spring device coupled between said head and said second longitudinal side; and
    an accessory tool comprising a second interlocking interface to engage with said first interlocking interface and coupled between said first threaded nut and said connector body;
    said head of said fastener configured to
        longitudinally compress said spring device against said second longitudinal side, and
        longitudinally extend said threaded shaft and said first threaded nut thereon, thereby lifting said accessory tool and disengaging said first and second interlocking interfaces.

2. The hot stick device of claim 1 wherein said first interlocking interface includes a first inner radial shelf; and wherein said distal end of said connector body includes a second inner radial shelf.

3. The hot stick device of claim 2 wherein said tool connector comprises a second threaded nut positioned between said first inner radial shelf and adjacent portions of said second interlocking interface.

4. The hot stick device of claim 1 wherein said first threaded nut comprises a threaded wing nut.

5. The hot stick device of claim 1 wherein each of said first interlocking interface and said second interlocking interface comprises alternating recesses and protrusions.

6. The hot stick device of claim 1 wherein said proximal end of said connector body comprises a hexagon-shaped outer radial edge.

7. The hot stick device of claim 6 wherein said proximal end of said connector body defines a circle-shaped recess within said hexagon-shaped outer radial edge and configured to receive said distal end of said insulated shaft.

8. The hot stick device of claim 1 wherein said tool connector comprises a washer coupled between said head and said spring device.

9. The hot stick device of claim 1 wherein said spring device comprises a coil spring.

10. A tool connector for a hot stick device having an insulated shaft having a proximal end, and a distal end opposing said proximal end, the tool connector comprising:
a connector body comprising
a proximal end coupled to said distal end of said insulated shaft,
a distal end, and
first and second opposing longitudinal sides extending between said proximal end and said distal end of said connector body,
said first longitudinal side of said connector body comprising a first interlocking interface,
said distal end defining a through passageway extending between said first and second opposing longitudinal sides,
a fastener having a head, and a threaded shaft extending in said through passageway;
a first threaded nut threadingly engaging said threaded shaft; and
a spring device coupled between said head and said second longitudinal side;
wherein an accessory tool includes a second interlocking interface to engage with said first interlocking interface and is coupled between said first threaded nut and said connector body;
said head of said fastener configured to
longitudinally compress said spring device against said second longitudinal side, and
longitudinally extend said threaded shaft and said first threaded nut thereon, thereby lifting said accessory tool and disengaging said first and second interlocking interfaces.

11. The tool connector of claim 10 wherein said first interlocking interface includes a first inner radial shelf; and wherein said distal end of said connector body includes a second inner radial shelf.

12. The tool connector of claim 11 further comprising a second threaded nut positioned between said first inner radial shelf and adjacent portions of the second interlocking interface.

13. The tool connector of claim 10 wherein said first threaded nut comprises a threaded wing nut.

14. The tool connector of claim 10 wherein each of said first interlocking interface and said second interlocking interface comprises alternating recesses and protrusions.

15. The tool connector of claim 10 wherein said proximal end of said connector body comprises a hexagon-shaped outer radial edge.

16. The tool connector of claim 15 wherein said proximal end of said connector body defines a circle-shaped recess within said hexagon-shaped outer radial edge and configured to receive said distal end of said insulated shaft.

17. A method for making a hot stick device, the method comprising:
forming a tool connector comprising
a connector body comprising
a proximal end coupled to a distal end of an insulated shaft,
a distal end, and
first and second opposing longitudinal sides extending between the proximal end and the distal end of the connector body,
the first longitudinal side of the connector body comprising a first interlocking interface,
the distal end defining a through passageway extending between the first and second opposing longitudinal sides,
a fastener having a head, and a threaded shaft extending in the through passageway,
a first threaded nut threadingly engaging the threaded shaft, and
a spring device coupled between the head and the second longitudinal side; and
providing an accessory tool comprising a second interlocking interface to engage with the first interlocking interface and coupled between the first threaded nut and the connector body;
the head of the fastener configured to
longitudinally compress the spring device against the second longitudinal side, and
longitudinally extend the threaded shaft and the first threaded nut thereon, thereby lifting the accessory tool and disengaging the first and second interlocking interfaces.

18. The method of claim 17 wherein the first interlocking interface includes a first inner radial shelf; and wherein the distal end of the connector body includes a second inner radial shelf.

19. The method of claim 18 wherein the tool connector comprises a second threaded nut positioned between the first inner radial shelf and adjacent portions of the second interlocking interface.

20. The method of claim 17 wherein the first threaded nut comprises a threaded wing nut.

* * * * *